United States Patent [19]
Maeda

[11] Patent Number: 5,616,289
[45] Date of Patent: Apr. 1, 1997

[54] SUBSTANCE AND/OR HEAT EXCHANGING TOWER

[75] Inventor: Yutaka Maeda, Yokohama, Japan

[73] Assignee: Mitsubishi Corporation, Tokyo, Japan

[21] Appl. No.: 692,506

[22] Filed: Aug. 5, 1996

Related U.S. Application Data

[63] Continuation of Ser. No. 408,372, Mar. 22, 1995, abandoned, which is a continuation-in-part of Ser. No. 180,655, Jan. 12, 1994, Pat. No. 5,454,988.

[51] Int. Cl.$^6$ ........................................ B01F 3/04
[52] U.S. Cl. ........................................ 261/112.2
[58] Field of Search ........................................ 261/112.2

[56] References Cited

U.S. PATENT DOCUMENTS

| | | | |
|---|---|---|---|
| 2,160,677 | 5/1939 | Romanoff | 261/112.2 |
| 3,374,994 | 3/1968 | Greer | 261/112.2 |
| 3,618,778 | 11/1971 | Benton | 261/112.2 |
| 4,186,159 | 1/1980 | Huber | 261/112.2 |
| 4,264,538 | 4/1981 | Moore et al. | |
| 4,657,711 | 4/1987 | Wigley | 261/112.2 |
| 4,981,621 | 1/1991 | Pluss | 261/112.2 |
| 5,124,087 | 6/1992 | Bradley et al. | 261/112.2 |
| 5,167,879 | 12/1992 | Streng | 261/112.2 |
| 5,269,465 | 12/1993 | Zich et al. | |

FOREIGN PATENT DOCUMENTS

| | | |
|---|---|---|
| 0070676 | 1/1983 | European Pat. Off. . |
| 54-15554 | 2/1979 | Japan . |
| 59-189296 | 10/1984 | Japan . |
| 1149479 | 6/1986 | U.S.S.R. ............ 261/112.2 |
| 792740 | 4/1958 | United Kingdom . |

*Primary Examiner*—Tim R. Miles
*Attorney, Agent, or Firm*—Frishauf, Holtz, Goodman, Langer & Chick, P.C.

[57] ABSTRACT

An exchanging tower having excellent gas/liquid contact efficiency includes a packing which comprises an arrangement of a plurality of sheet-like bases (102), each of which is corrugated to form folds inclined along the longitudinal axis of the tower such that the folds cross one another. The corrugated sheet-like bases have plural continuous concave/convex channels formed on the surface thereof and extending in a horizontal direction. The packings are formed such that, when the packings are installed in the tower, in each corrugated sheet-like base a wall surface (107) of a concave channel above a crest (105) of the meander of an adjacent convex channel of the sheet-like base is located on an upper side along the longitudinal axis of the tower at a position higher than a wall surface (108) of a convex channel below a trough (106) of the meander of the convex channel.

6 Claims, 8 Drawing Sheets

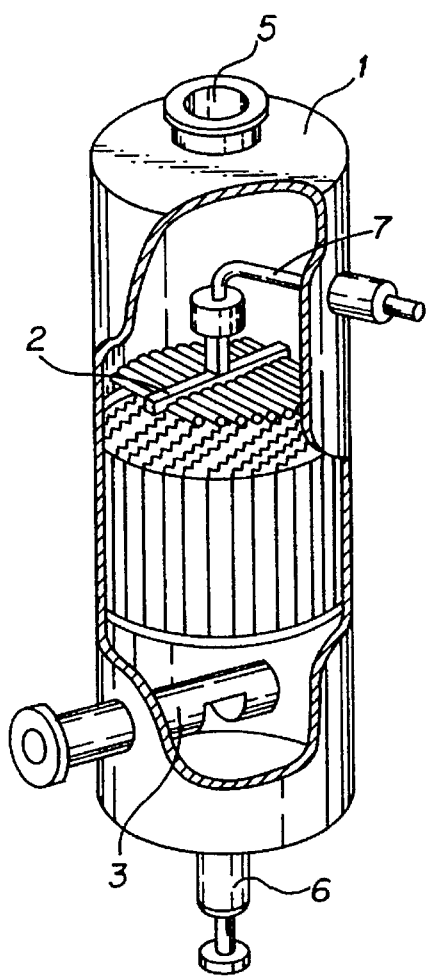 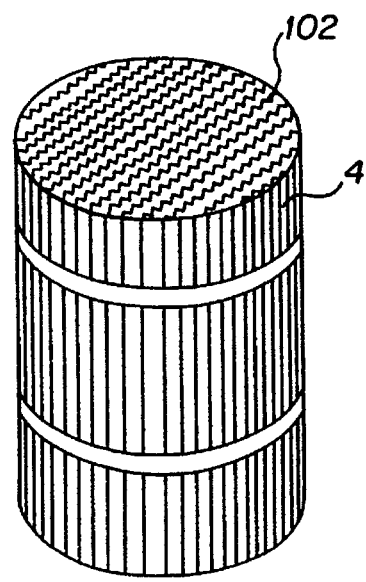
FIG. 1                    FIG. 2

CURVED

FLEXED

CIRCLE

ELLIPSE

TRIANGLE

SQUARE

TRAPEZOID

SUBSTANCE AND/OR HEAT EXCHANGING TOWER

This application is a continuation of application Ser. No. 08/408,372, filed Mar. 22, 1994, now abandoned, which is a continuation-in-part of prior application Ser. No. 08/180,655, filed Jan. 12, 1994, now U.S. Pat. No. 5,454,988, issued of Oct. 3, 1995.

This is a continuation-in-part application of Ser. No. 08/180,655 filed on Jan. 12, 1994.

BACKGROUND OF THE INVENTION

1. Field of the Invention

The present invention relates to a substance and/or heat exchanging tower.

2. Prior Art

Conventionally, a substance and/or heat exchanging tower such as a distillation tower, an absorption tower and a recovery tower comprises a packing generally composed of sheet-like bases which is used as media for the contact of a liquid and a gas. In addition, other conventional packing of this type has been composed of materials other than sheet-like bases. For example, some packings have been composed of net-like bases instead of sheet-like bases. Though a packing composed of net-like bases exhibits good performance, the price thereof is too high for practical use. In comparison, a packing composed of sheet-like bases is suitable for practical use due to its low price, though it exhibits a slightly inferior performance. Hence, improvement in the performance of a packing employing sheet-like bases is demanded.

It is known that it is necessary to heighten contact efficiency between a liquid and a gas in order to improve the performances of this type of packing. Various means have been attempted therefor. One attempt is to increase the volume of the packing per unit volume of the tower. This intends to increase a gas/liquid contact area by increasing the volume of the packing. However, there occurs one problem in this method. Namely, a larger volume of packing causes a higher pressure loss in the upward gas flow. This has a deleterious effect on the operation of a substance and heat exchanging tower. Even if the contact area is increased, improvement in contact efficiency cannot be accomplished unless sufficient diffusion of the gas and liquid is effected on the surface of the packing.

In practical operation of the tower, since the viscosity and surface tension of the liquid have more influence on the operational conditions of the tower than those of the gas, it is necessary to improve the diffusion of the liquid particularly. Consequently, it has been attempted to improve the efficiency of conventional packing by improving the diffusion of liquid.

Japanese Patent Publication No. 15554/79 of Huber discloses a method of forming channels on the surface of a sheet-like base and thereby diffusing a liquid to the entire surface of the base. However, it is only the spread of the liquid that this method takes into consideration.

Further, in some conventional packings, it is intended to spread a liquid in a lateral (horizontal) direction by providing gatherings on the surface of a sheet-like base horizontally.

In the case of providing gathering or channels on a sheet-like base in order to spread a liquid in horizontal direction, it is more advantageous to effect diffusion of a liquid in horizontal direction that the depth of the fold of gathering or a channel be made larger. However, if the surface of the packing is inclined in a horizontal direction, when the packing is mounted in the tower, the liquid flows to a lower part running down the channel due to the inclination, resulting in a polarized liquid flow. In using this kind of packing, a polarized liquid flow is one of the main problems with respect to the performance of the packing. To overcome this problem, packings are provided in shallow gatherings. However, such a method still does not provide a satisfactory liquid spread.

In order to heighten the contact efficiency between a liquid and a gas, it is necessary not only to accomplish the diffusion of the liquid as explained above but also to improve the mutual relationship of flows of the liquid and the gas, taking the relation between the liquid and the gas into consideration.

One possible method for solving the above problem is to break a boundary film existing on the interface between the liquid phase and the gas phase by providing a specific shape of reliefs on the surface of the sheet-like base. Though it has been known that the breakage of a boundary film is useful for the improvement of contact efficiency, no conventional packing has been found which can accomplish both the diffusion of a liquid and the breakage of a boundary film.

For instance, the packing described in Japanese Patent Publication No. 15554/79 does not include the concept of breaking a boundary film. The method according to Japanese Patent Publication No. 15554/79 is not satisfactory from the viewpoints of both the diffusion of a liquid and the breakage of a boundary film.

SUMMARY OF THE INVENTION

The present inventor has made extensive studies with a view to overcoming the defects of the prior art, and as a result, has found that much better diffusion of a liquid and a gas as well as improvement in gas/liquid contact can be accomplished simultaneously by forming meandering concavo/convex channels on the surface of a sheet-like base and corrugating said sheet-like base, and further, specifically defining a location of portions of the concave channels and the convex channels of the sheet-like base to the longitudinal axis of the tower when the sheet-like base is installed in the tower.

The first embodiment of the present invention refers to: a substance and/or heat exchanging tower where a liquid is supplied from an upper part thereof and a gas is supplied from a lower part thereof, and an exchange of heat and/or substances between the liquid and the gas is effected by contact between the gas and the liquid in the inside of the tower, which comprises a tower housing (1) and a packing (4) accommodated in the tower, the packing is characterized by comprising:

a plurality of sheet-like bases (102), each of said sheet-like bases being placed along a longitudinal axis of the tower and corrugated to form folds therein which are inclined along the longitudinal axis of the tower, said sheet-like bases being arranged adjacent to one another such that the folds each sheet-like base cross the folds of another adjacent sheet-like base;

said sheet-like bases each having plural continuous adjacent concave/convex channels formed on the surface thereof, said channels extending generally in a lateral direction of the tower;

at least one of a lower surface of the concave channels and an upper surface of the convex channels being in a meandering form; and wherein the sheet-like bases are formed such that, when the packings are installed in the tower, a wall surface (107) of a concave channel above a crest (105) of the meander of an adjacent convex channel of the sheet-like base is located on an upper side along the longitudinal axis of the tower at a position higher than a wall surface (108) of the convex channel below a trough (106) of the meander of the convex channel.

Another embodiment of the present invention refers to: a substance and/or heat exchanging tower as defied above, wherein the meandering concave/convex channels is arranged such that meandering pitches of at least one of adjacent convex channels and adjacent concave channels are shifted in relation to one another.

In the packing of the second embodiment of the present invention, it is preferable that the pitch of the meandering of the convex channel and that of the adjacent convex channel (and the pitches of the adjacent concave channels) are shifted in relation to one another by a half pitch.

BRIEF DESCRIPTION OF THE DRAWINGS

FIG. 1 is a perspective view of the heat/substance exchanging tower according to one embodiment of the present invention.

FIG. 2 is a perspective view of one embodiment of the packing used in the present invention.

DETAILED DESCRIPTION OF THE INVENTION

Figure 3A:
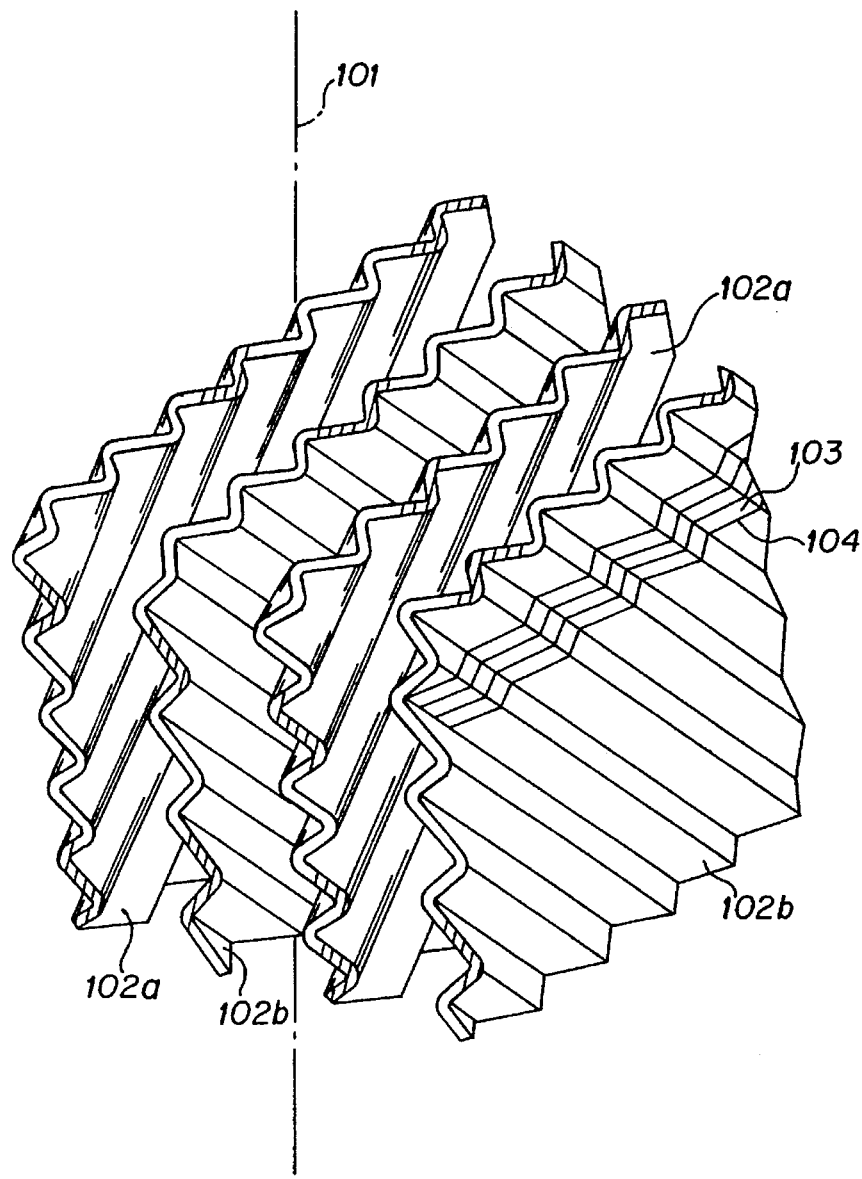
FIG. 3A is a perspective view showing the sheet-like bases constituting the packing according to the present invention in the state that the packing is mounted along the tower longitudinal axis and with the bases laminated to each other.

Hereunder, the effects of the present invention will be described. A packing used in the heat/substance exchanging tower according to the present invention is provided by preparing sheet-like bases in which meandering concavo-convex channels extending in a lateral direction are provided, corrugating the sheet-like base to form folds that are inclined with respect to the longitudinal axis of the tower, and laminating a plurality of the thus constituted sheet-like bases in such a manner that the folds cross one another. As a result of such a constitution in using the packing according to the present invention, diffusion of a gas and a liquid can be accomplished, the flow of the liquid and the gas is made turbulent, by which breakage of a boundary film of the liquid and the gas is accelerated, and thereby gas/liquid contact efficiency is improved, and further the flow of the liquid made smooth by defining the location of portions of the concave channels and the convex channels which are provided on the surface of the sheet-like base along the longitudinal axis of the tower when the packings are installed in the tower and thereby preventing undesirable accumulation of the liquid. As a result, the gas/liquid contact effects are further heightened in the packing of the present invention.

Hereunder, the present invention will be described with reference to the drawings. FIG. 1 is a perspective view of the heat/substance exchanging tower according to one embodiment of the present invention. The tower comprise a tower housing (1) and a packing accommodated in the tower. Further, the tower may also comprise a liquid distributor (2) accommodated in the housing which distributes and supplies the liquid from the upper part of the tower, and means (3) for introducing the gas into the lower part of the tower housing which is also referred to as a gas introducing port. The tower housing may have an gas outlet (5) at the top thereof through which the gas which contacted with the liquid is discharged and a liquid outlet (6) at the bottom thereof through which the liquid which contacted with the gas is discharged. In the tower according to the present invention, the tower housing (1), a liquid distributor (2) and means (3) for introducing the gas, may be of any conventional structure which is well known and usually used in the art. For example, a liquid distributor disclosed in the co-pending U.S. Ser. No. 08/180, 656 filed on Jan. 12, 1994 as well as the one disclosed in U.S. Pat. Nos. 4,264,538 of Moore et al. and 5,269,465 of Zich et al, which are incorporated herein by reference, may be used in the present invention. FIG. 2 shows a perspective view of the packing (4) used in the tower and FIG. 3 shows a perspective view showing the state how the sheet-like bases constitutes the packing according to the present invention. The packing (4) is,formed by placing a plurality of sheet-like bases (102) along a longitudinal axis and tying up them into a bundle (FIG. 2). Each of the sheet-like bases (102) is corrugated to form folds therein which are inclined along the longitudinal axis (FIG. 3). The sheet-like bases are arranged adjacent one another such that the folds of each sheet-like base cross the folds of another adjacent sheet-like base.

The liquid is introduced into the tower through a pipe (7) connected to the liquid distributor (2). The liquid is led to the liquid distributor (2) and then distributed onto the packing (4). The liquid then flows downwardly on the surface of the sheet-like bases which constitute the packing while it diffuses in horizontal direction. On the other hand, the gas is introduced into the tower through the gas introducing port (3) and flows upwardly through the space between the sheet-like bases. Thus, the liquid and the gas contact with each other inside the packing, whereby heat and/or substance exchange in the gas and liquid is accomplished.

Figure 3B:
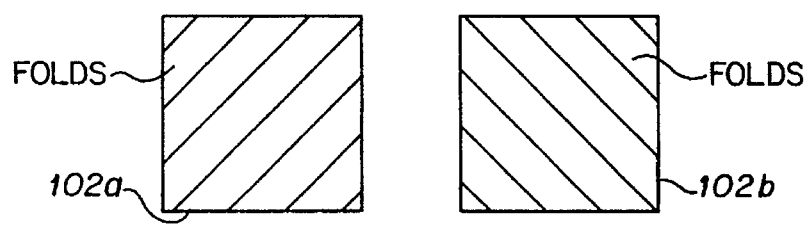
FIG. 3B illustratively depicts the bases of FIG. 3A in a side-by-side arrangement to show the relative orientation of the folds.
Figure 4:
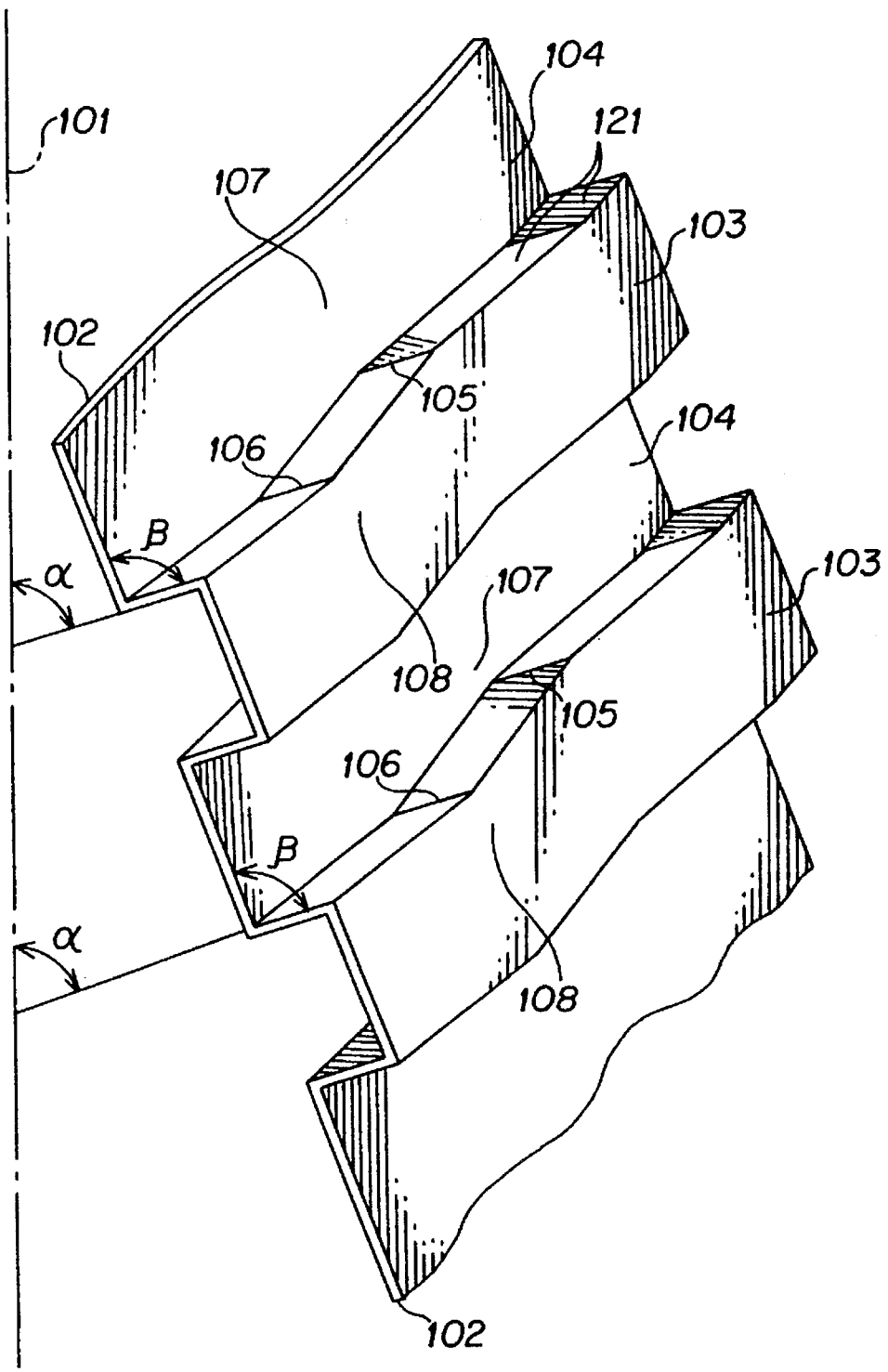
FIG. 4 is a perspective view showing the shape of the sheet-like bases according to the present invention.

FIG. 3A is a perspective view showing the state wherein the packing according to the present invention is installed in the tower along the longitudinal axis of the tower. (101) is the longitudinal axis of the tower, bases (102a) and (102b) are corrugated sheet-like bases, (103) is a convex channel formed on the surface of the sheet-like base and (104) is a concave channel. FIG. 3B shows bases (102a) and (102b) side-by-side so that the orientation of the folds on the respective bases relative to each other can be clearly discerned. It is to be understood that, in use, the bases are not placed side-by-side. FIG. 4 is a perspective view of the sheet-like base according to the present invention. Convex channels (103) and concave channels (104) are provided alternately along the longitudinal axis of the tower. The convex channel has crests (105) formed in a meander toward the upper side of the longitudinal axis of the tower and troughs (106) formed in meander toward the upper side of the longitudinal axis of the tower. In FIG. 4, (105) shows crests of the meanders of convex channels and (106) shows troughs of the meanders of convex channels. (107) shows the wall surface of the concave channel above the crest of the meander of the adjacent convex channel. (108) shows the wall surface of the convex channel below the trough of the meander of the convex channel.

First of all, the effect caused by the meanders of the channels will be described below. A liquid flowing downwardly from the upper side of the longitudinal axis of the tower strikes the upper surface (121) of the convex channel of a sheet-like base and is dispersed and spread on the top surface. The dispersed and spread liquid falls downwardly from the trough (106) of the meander of the convex channel. When the amplitude of the meander of the convex channel (defined as the difference in the vertical direction between crest (105) and trough (106), with base (102) positioned vertically along axis (101)) is small and the depth of the channel is large, the spread of the liquid in a horizontal direction is further continued. The liquid which has fallen downwardly further strikes the upper surface of the convex channel below it. The spread in horizontal direction and the downward flow of the liquid are repeated in the same manner.

In this case, if the amplitude of the meander of the convex channel is large, the spread of the liquid in horizontal direction is disturbed because more of the liquid will tend to stay in a trough and fall downwardly from the trough without spreading. It is preferable that the amplitude of the meander of the convex channel is below one-fifth of the distance between the adjacent crests (105).

To ensure that the liquid is spread in a lateral direction (i.e. horizontally) on the surface of the sheet-like base, it is necessary for the surface of the sheet-like base to have a liquid-receiving angle ($\alpha$) relative to the longitudinal axis of the tower (see FIG. 4). If the surface of the base does not have this angle, namely, the surface of the sheet-like base is in an almost vertical state, the liquid falls straight down and lateral spread of the liquid is not accomplished. In practice, a preferable liquid-receiving angle ($\alpha$) is of the order of 90° to 120°.

Figure 9A:
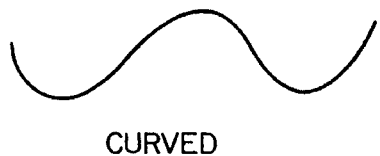
FIGS. 9A and 9B show different forms of a meander.
Figure 9B:

In the present invention, in order to provide said liquid-receiving angle, meandering concavo/convex channels are provided on the surface of the sheet-like base, whereby spread of the liquid in horizontal direction is effected. The shape of the meandering channels may be of a curved or flexed form, as shown in FIGS. 9A and 9B, respectively. The shape of the meander shown in FIG. 4 is of the flexed form type. The cross section of base (102) showing the shape of the concavo/convex channels may be square, as is evident from FIGS. 4 and 5, or it may be in the configuration of a circle, an ellipse, a triangle, a square, or a trapezoid as shown, respectively in FIGS. 10A to 10E, or even other polygons.

By constituting the channels as mentioned above, the liquid can fall from the troughs (106) of the convex channels even if the channels are deepened. Further, the surface area the packing can be increased by deepening the channels. Therefore, the spread of the liquid in horizontal direction, the prevention of a converged flow and the increase of a contact area can be accomplished simultaneously. This has never been accomplished by a conventional packing. When the liquid falls downwardly from the upper part of the tower, it is dispersed by means of the crest portions of the meanders of the convex channels facing the upper side of the longitudinal axis of the tower. The flow of the liquid can be made turbulent thereby, and the turbulent flow of the liquid enhances the gas/liquid contact efficiency of the packing. Here, as a further effective method can be mentioned the following method. This is to shift the pitches of the meander between adjacent two convex channels and those between adjacent concave channels (see FIG. 6). In this way, liquid falling from the trough (106) of the convex channel strikes the crest (105) of the convex channel located below it and is dispersed and spread in horizontal direction, and further flows down and strikes the crest of the convex channel one after another; thus dispersion and spread of the liquid can be repeated.

With respect to a gas, when a gas rises upwardly from the lower part of the tower, it is dispersed by means of the crest portions of the meander of the convex channel facing the lower side of the longitudinal axis of the tower. The flow of the gas can be made turbulent thereby, and the turbulent flow of the gas enhances the gas/liquid contact efficiency of the packing. When the pitches of the meanders of the channels are shifted in relation to one another in the manner described above, better dispersion and diffusion of the gas can be accomplished and gas/liquid contact efficiency can also be improved, as in the case of a liquid.

The form of the crests of the meander of the channels may be sharp or rounded.

As described above, better diffusion of a gas and a liquid can be accomplished by allowing channels to meander, and at the same time, boundary films of the liquid and the gas can be broken by providing turbulent flows thereof.

The above is an explanation regarding the effects resulting from meandering of the channels. Next, means of preventing a liquid from accumulating will be described in connection with FIG. 5 which shows an arrangement that is not in accordance with the present invention in order to demonstrate the shortcoming associated with it.

In a packing of this kind, performance is determined by how much contact between a gas and a liquid is effected within a unit volume. In order to accomplish a better performance, it is necessary to provide a larger gas/liquid contact area per unit volume. When an exchanging tower is operated by using a packing having a large gas/liquid contact area, the liquid falls down while being held on the surface of the packing in a larger amount compared with the case of operating using a packing with a small gas/liquid contact area. An important point with respect to the operation of a tower is that all of the liquid maintained on the surface of the packing falls down when the operation is stopped. This is so because liquid which remains and accumulates on the packing after the operation has been stopped is considered to prevent proper contact with the gas. Since the amount of a gas/liquid contact area is directly proportional to the amount of an accumulating liquid in general, when a gas/liquid contact area is increased in order go raise gas/liquid contact efficiency, the amount of the liquid accumulating on the packing generally increases. Consequently, improvement in efficiency of the packing cannot be effectively accomplished.

The present invention prevents the unnecessary accumulation of a liquid, by paying attention to this point.

In the packing used in the tower according to the present invention, the sheet-like base has been corrugated to form folds inclined along the longitudinal axis of the tower, and hence their surfaces face in two directions. One surface faces the upper side of the longitudinal axis of the tower (e.g. 121 in FIG. 4) and the other surface faces the lower side of the longitudinal axis of the tower. Comparing these two surfaces, the surface of the sheet-like base facing the upper side of the tower plays the more important role regarding the spread and accumulation of the liquid. Accordingly, the following description is provided concerning the surface facing the upper side of the longitudinal axis of the tower of the sheet-like base.

Figure 10A:
FIGS. 10A to 10E show different cross sections of the concavo/convex channels.
Figure 10B:
Figure 10C:
Figure 10D:
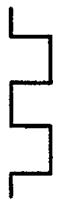
Figure 10E:

Regarding the shape of the channels of the sheet-like base, in a packing such as that according to the present invention, the channels are generally formed by subjecting a sheet-like base to an embossing process which forms the cross section of a trapezoid, as shown in FIG. 10E, and hence the upper surface (121) of the convex channel which forms a liquid-receiving angle ($\alpha$), has an angle of aperture ($\beta$) of more than 90° to the basic surface of the sheet-like base (see FIG. 4). Here, if the sheet-like base with a channel having a liquid-receiving angle ($\beta$) of more than 90° formed thereupon is used in the tower in such a state that wall surfaces (107) and (108) stand vertically while it is not corrugated, the liquid falls down along the surface of the sheet-like base and strikes the upper surface (121) of the convex channel. The liquid spreads over the upper surface (121) in a lateral direction, and then falls down from the trough portion of the meandering (106) of the convex channel. Accordingly, in such a case, even if the liquid-receiving angle ($\beta$) of the channel is 90° or the depth of the channel is large, the liquid can fall down from the trough portion (106) of the convex channel by way of the meander of the channel.

However, in the packing according to the present invention, the sheet-like base is corrugated to form folds inclined along the longitudinal axis of the tower, and a phenomenon different from the above-mentioned flow of the liquid occurs, which gives rise to the accumulation of liquid. With respect to the sheet surface facing the upper side of the longitudinal axis of the tower (e.g. 121), even if, for example, an angle of aperture ($\beta$) is 90° relative to the basic surface (107) of the sheet-like base, a liquid-receiving angle ($\alpha$) in this part becomes less than 90° when the packing is mounted in the tower, since the basic surface itself of the sheet-like base is inclined along the longitudinal axis of the tower. The larger the inclination of the basic surface (107) of the sheet-like base becomes, the smaller is the liquid-receiving angle ($\alpha$) of this part, and when the depth of channels is large and/or when the amplitude of the meandering of the channels is small, the liquid tends to be held in the concave channels. Consequently, though the liquid flows smoothly when the sheet-like base stands vertically without being inclined along the longitudinal axis of the tower, the flow of the liquid on the packing of the present invention is disturbed by the inclination of the sheet-like base, which is problematic.

Figure 5:
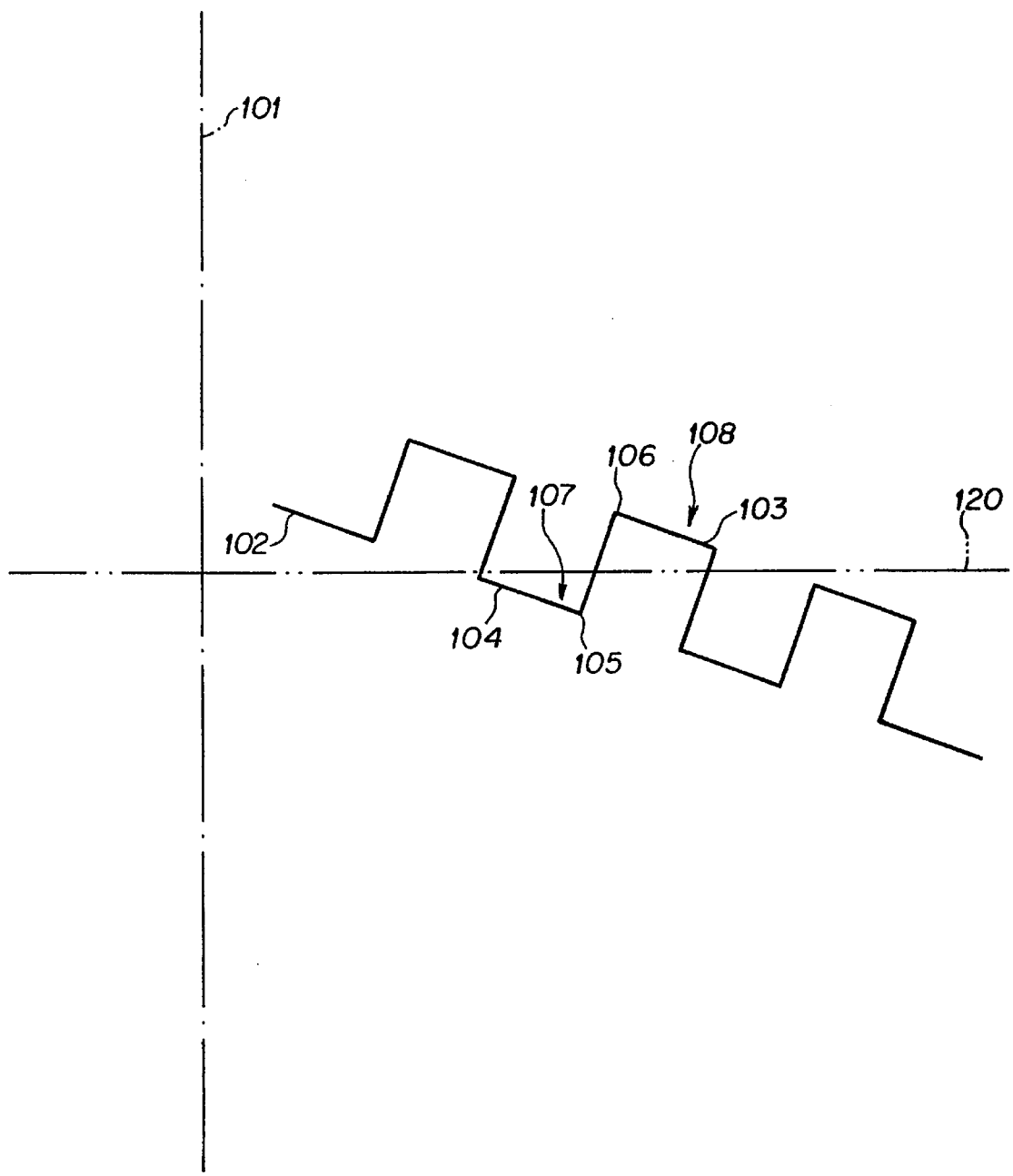
FIG. 5 is a sectional view showing the sheet-like base of FIG. 4, but arranged in a way which is not in accordance with the present invention in order to show why this arrangement is problematic.

As shown in FIG. 5, when the inclination of the basic surface of the sheet-like base to the longitudinal axis of the tower (101) is large and the depth of channels is deep, this may cause the wall surface (107) of the concave channel above the crest (105) of the meander of the adjacent convex channel of the sheet-like base to be located at a position lower than the wall surface (108) of the convex channel below the trough of the meander of the convex channel. Line 120 in FIG. 5 shows the horizontal line. In such a relationship, liquid accumulates in the concave channels. In the present invention, the relationship of the location of channels is defined in order to avoid this occurrence.

In the present invention, the following constitution was adopted in order to overcome this problem. The packing used in the tower according to the present invention is formed by firstly preparing sheet-like bases in which meandering concave/convex channels extending in a lateral direction are provided on the surface of the bases, corrugating the bases to form folds that are inclined with respect to the longitudinal axis. The bases thus corrugated are then arranged adjacent to one another such that the folds of each sheet-like base cross the folds of another adjacent sheet-like base. In the sheet-like bases according to the present invention, the meandering concave/convex channels are formed such that, when the packing is installed in the tower, the wall surface (107) of the concave channel above the crest (105) of the meander of the adjacent lower convex channel is located at a position higher than the wall surface (108) of the convex channel below the trough (106) of the meander of the convex channel.

By thus defining the relationship of the location the channels, it becomes possible to accomplish a smooth downward flow of the liquid and retainment of the liquid in an amount needed for gas/liquid contact by adjusting a liquid-receiving angle ($\alpha$), even in the case that the inclination of the basic surface of the sheet-like base along the longitudinal axis of the tower is large or the depth of channels provided on the surface of the sheet-like base is large.

As described above, the present invention has accomplished a large improvement in the gas/liquid contact efficiency by allowing channels to meander and thereby reduce the accumulation of liquid in the channels caused by the inclination of the basic surface of the sheet-like base along the longitudinal axis of the tower.

Hereunder, other various embodiments of the present invention will be described.

Figure 6:
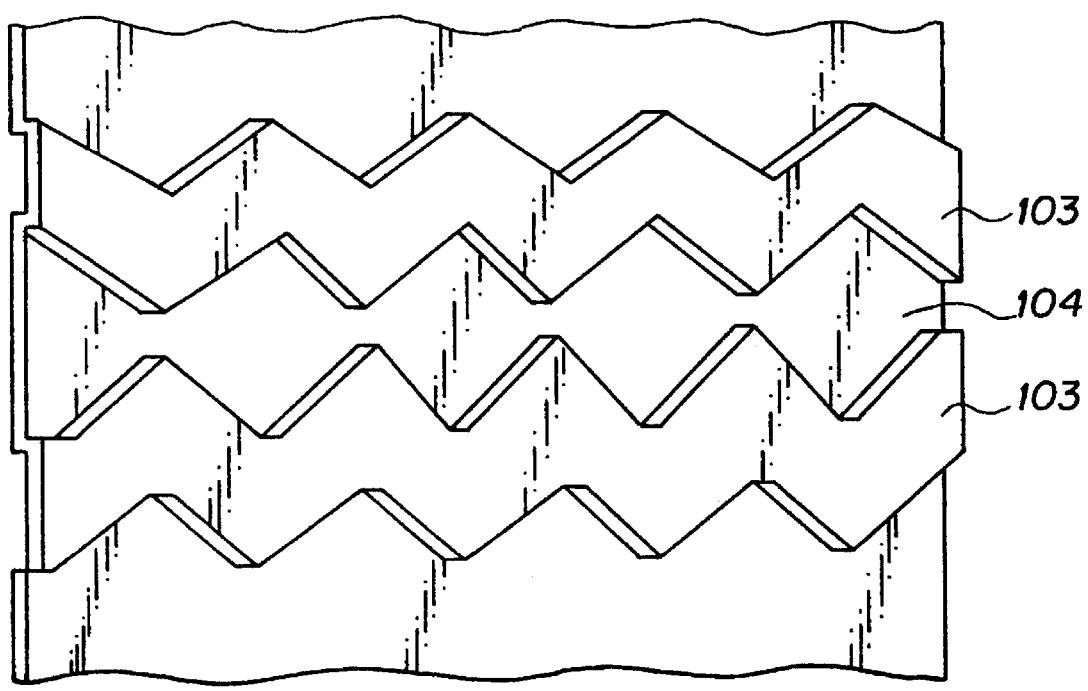
FIG. 6 is a perspective view showing the shape of the sheet-like base according to another embodiment of the present invention.
Figure 7:
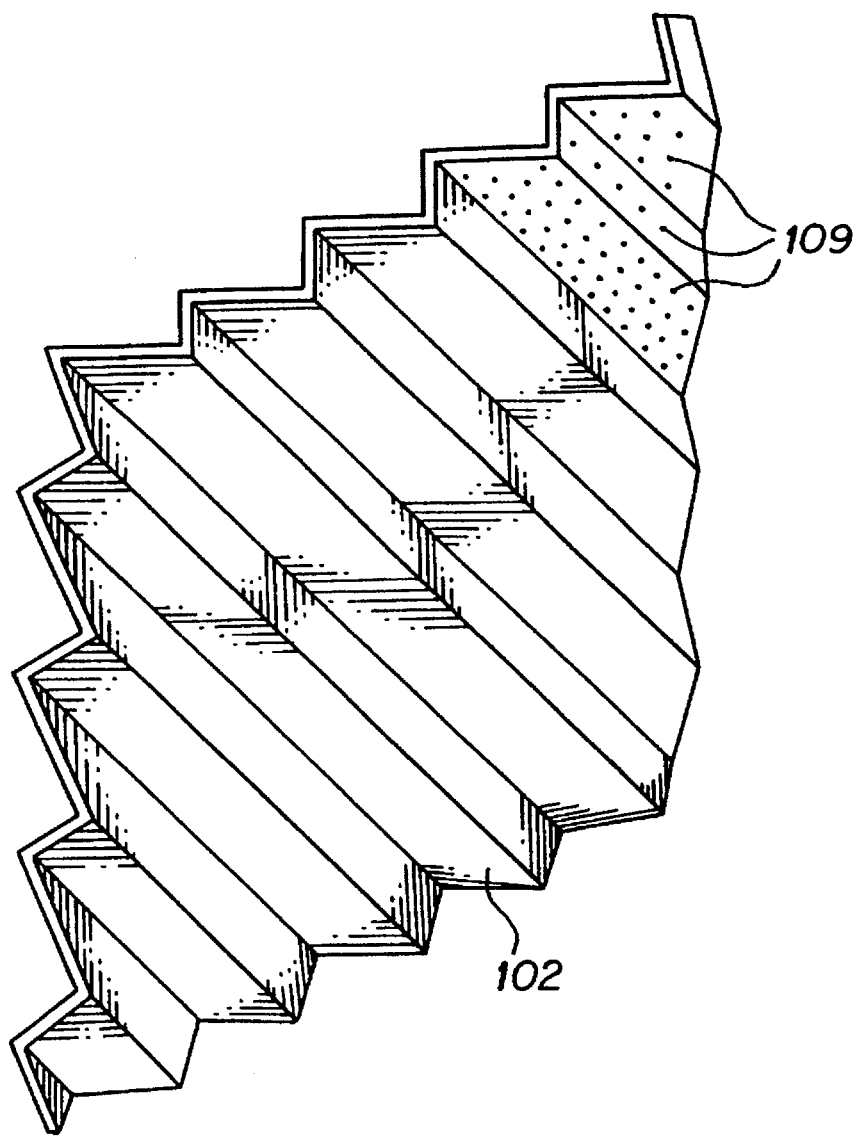
FIG. 7 is a perspective view showing the shape of the sheet-like base according to another embodiment of the present invention.

FIG. 6 is a perspective view of the sheet-like base according to the present invention, showing an embodiment in which pitches of the meanders between adjacent channels are shifted. In FIG. 6, meandering pitches between the adjacent convex channels are shifted by half a pitch, but this is not an indispensable requirement of the present invention. Besides, as shown in FIG. 7, pores (109) with any size may be provided at any position along the sheet-like base, through which the liquid may fall downwardly.

Figure 8:
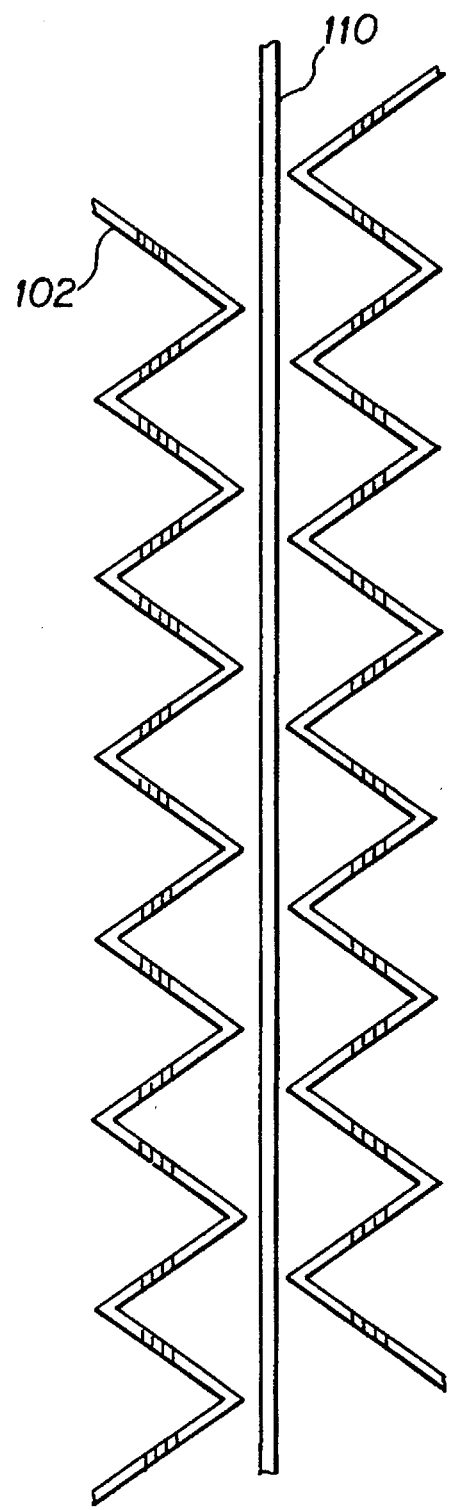
FIG. 8 is a sectional view showing a constitution of the packing according to another embodiment of the present invention.

As shown in FIG. 8, one or a plurality of sheet-like bases, net-like sheets or expanded metal sheets or a combination thereof (110) without being corrugated may be held between the corrugated sheet-like base (102).

Moreover, the corrugated sheet-like base may be formed by laminating a plurality of sheet-like bases together.

Further, the concavo/convex channels of the sheet-like base may be formed by laminating one sheet-like base upon another sheet-like base.

The packing used in the tower according to the present invention may be made of a metal, plastic, glass or ceramic.

As described above, the packing used in the tower according to the present invention is characterized by being formed such that, in the state that the packing is installed in the tower, that is, the sheet-like bases (102) are corrugated to form folds which are inclined along the longitudinal axis and are placed along the longitudinal axis, the wall surface (107) of the concave channel above the crest (105) of the meander the adjacent lower convex channel of the sheet-like base is located at a position higher than the wall surface (108) of the convex channel below the trough (106) of the meander of the convex channel. However, it will be apparent to those skilled in the art that it is sufficient for the above relationship to be established on the surface of the sheet-like base facing to the upper side of the tower.

What is claimed is:

1. A substance and/or heat exchanging tower where a liquid is supplied from an upper part thereof, and an exchange of heat and/or substances between the liquid and the gas is effected by contact between the gas and the liquid in the inside of the tower, which comprises a tower housing (1) and a packing (4) accommodated in the tower, wherein the packing comprises:

a plurality of sheet-like bases (102), each of said sheet-like bases being placed along a longitudinal axis of the tower and corrugated to form folds therein which are inclined relative the longitudinal axis of the tower, said sheet-like bases being arranged adjacent to one another such that the folds of each sheet-like base cross the folds of another adjacent sheet-like base;

and means forming plural continuous adjacent concave/convex channels on the surface of said corrugated folds, said channels extending generally in a direction perpendicular to the longitudinal axis of the tower;

at least one of a lower surface of the concave channels and an upper surface of the convex channels being in a meandering form; and wherein the sheet-like bases are formed such that, when the bases are installed in the tower, a wall surface (107) of a concave channel above a crest (105) of the meander of an adjacent convex channel of the sheet-like base is located on an upper side along the longitudinal axis of the tower at a position higher than a wall surface (108) of the convex channel below a trough (106) of the meander of the convex channel.

2. The substance and/or heat exchanging tower of claim 1, wherein said sheet-like bases comprise a plurality of laminated sheet members.

3. The substance and/or heat exchanging tower of claim 1, wherein said plurality of sheet-like bases are laminated one upon another such that said folds of adjacent sheet-like bases cross each other.

4. The substance and/or heat exchanging tower of claim 1, wherein the meandering concave/convex channels is arranged such that meandering pitches of at least one of adjacent convex channels and adjacent concave channels are shifted in relation to one another.

5. The substance and/or heat exchanging tower of claim 4, wherein said sheet-like bases comprise a plurality of laminated sheet members.

6. The substance and/or heat exchanging tower of claim 4, wherein said plurality of sheet-like bases are laminated one upon another such that said folds of adjacent sheet-like cases cross each other.

* * * * *